US012039954B2

(12) United States Patent
Kim et al.

(10) Patent No.: US 12,039,954 B2
(45) Date of Patent: Jul. 16, 2024

(54) GAMMA LOOKUP TABLE COMPRESSION BASED ON DIMENSIONALITY REDUCTION

(71) Applicant: Google LLC, Mountain View, CA (US)

(72) Inventors: Hyunchul Kim, San Jose, CA (US); Sun-il Chang, San Jose, CA (US); Wonjae Choi, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/635,980

(22) PCT Filed: Jan. 21, 2020

(86) PCT No.: PCT/US2020/014327

§ 371 (c)(1),
(2) Date: Feb. 16, 2022

(87) PCT Pub. No.: WO2021/150205

PCT Pub. Date: Jul. 29, 2021

(65) Prior Publication Data

US 2022/0301516 A1 Sep. 22, 2022

(51) Int. Cl.
*G09G 5/00* (2006.01)
*G09G 5/10* (2006.01)

(52) U.S. Cl.
CPC ............... *G09G 5/006* (2013.01); *G09G 5/10* (2013.01); *G09G 2320/0626* (2013.01); (Continued)

(58) Field of Classification Search
CPC .. G09G 5/006; G09G 5/10; G09G 2320/0626; G09G 2320/0673; G09G 2354/00
See application file for complete search history.

(56) References Cited

U.S. PATENT DOCUMENTS

| | | | |
|---|---|---|---|
| 5,359,702 | A | 10/1994 | Mukai |
| 9,055,227 | B2 | 6/2015 | Batur et al. |

(Continued)

FOREIGN PATENT DOCUMENTS

| | | |
|---|---|---|
| CN | 101345820 | 1/2009 |
| CN | 109672451 | 4/2009 |

(Continued)

OTHER PUBLICATIONS

International Preliminary Report on Patentability in International Appln. No. PCT/US2020/014327, mailed on Aug. 4, 2022, 13 pages.

(Continued)

*Primary Examiner* — Abbas I Abdulselam
(74) *Attorney, Agent, or Firm* — Fish & Richardson P.C.

(57) ABSTRACT

Methods, systems, and apparatus, including computer programs encoded on a computer storage medium, for gamma lookup table compression based on dimensionality reduction. In one aspect, a method includes obtaining a selection of a particular display condition for a display panel from among different display conditions for the display panel, selecting, based on the selection of the particular display condition, a set of weights for a set of basis functions from among different sets of weights that correspond to the different display conditions for the display panel, determining a gamma lookup table for the particular display condition for the display panel based on the set of weights that were selected and the set of basis functions, and remapping an image to be output on the display panel based on the gamma lookup table for the particular display condition.

19 Claims, 5 Drawing Sheets

(52) U.S. Cl.
CPC ............... *G09G 2320/0673* (2013.01); *G09G 2340/0435* (2013.01); *G09G 2354/00* (2013.01); *G09G 2360/16* (2013.01)

(56) References Cited

U.S. PATENT DOCUMENTS

| | | | | |
|---|---|---|---|---|
| 9,965,999 | B1 * | 5/2018 | Barnes | G09G 3/3413 |
| 9,997,135 | B2 | 6/2018 | Sullivan et al. | |
| 2012/0287144 | A1 | 11/2012 | Gandhi et al. | |
| 2016/0133174 | A1 * | 5/2016 | Jeong | G09G 5/06<br>345/694 |
| 2016/0314760 | A1 | 10/2016 | Jangda et al. | |
| 2017/0337889 | A1 * | 11/2017 | Wei | G09G 3/3677 |
| 2019/0156737 | A1 | 5/2019 | Choi et al. | |

FOREIGN PATENT DOCUMENTS

| | | |
|---|---|---|
| CN | 104835460 | 8/2015 |
| CN | 104954797 | 9/2015 |
| CN | 105074807 | 11/2015 |
| CN | 106205474 | 12/2016 |
| EP | 1233610 | 8/2022 |

OTHER PUBLICATIONS

International Search Report and Written Opinion in International Appln. No. PCT/US2020/014327, mailed on May 29, 2020, 19 pages.

Office Action in Chinese Appln. No. 202080059766.0, mailed on Apr. 23, 2024, 26 pages (with English translation).

* cited by examiner

GAMMA LOOKUP TABLE COMPRESSION BASED ON DIMENSIONALITY REDUCTION

CROSS-REFERENCE TO RELATED APPLICATIONS

This application is a National Stage Application under 35 U.S.C. § 371 and claims the benefit of International Application No. PCT/US2020/014327, filed on Jan. 21, 2020, the contents of which are incorporated herein by reference.

BACKGROUND

Gamma correction may be performed when showing an image on a display. For example, values of pixels in the image may be gamma corrected and the gamma corrected values may then be used to display the image. Gamma correction may be used so that an image is accurately shown. For example, gamma correction may account for variations in performance of different displays due to differences in physical structures of pixels across displays.

SUMMARY

This specification describes techniques, methods, systems, and other mechanisms for gamma lookup table (LUT) compression based on dimensionality reduction. Gamma lookup tables may be used so that images are accurately displayed on the displays. For example, gamma lookup tables may remap a gamma value of G50 for a pixel in an image to G48 so that the display accurately shows that pixel of the image. In another example, the gamma lookup tables may remap a gamma value of G51 for a pixel in an image to G52 so that the display accurately shows that pixel of the image.

Gamma lookup tables may be unique to each display. A first display may have a gamma lookup table with output values that are different than a second display due to differences in how pixels in each display respond to driving current. For example, a gamma lookup table for a first display may remap G50 to G45 and a gamma lookup table for a second display may remap G50 to G48.

Displays may have many gamma lookup tables for performing gamma correction. For example, an organic light emitting diode (OLED) display may operate at two different refresh rates and seven display brightness values (DBV) so store forty two gamma lookup tables (three for each of red, green, and blue multiplied by two for each frequency multiplied by seven for each DBV).

The DBV may correspond to different ranges of brightness for a display. For example, a display brightness between 0-13% for an entire display may correspond to a DBV of 0 (also referred to as DBV 0), a display brightness between 14-26% for an entire display may correspond to DBV 1, a display brightness between 27-41% for an entire display may correspond to DBV 2, etc. In another example, DBV for a display may be split into three different ranges where DBV 0 corresponds to 0-33% brightness for an entire display, DBV 1 corresponds to 34-66%, and DBV 2 corresponds to 67-100%.

As the number of refresh rates and DBV for a display increases so may a number of gamma lookup tables that are stored for the display. Additionally, some displays may include areas with different pixel densities. For example, a display may include a top portion of the display with a pixel density that is half that of a bottom portion of the display. The areas with different pixel densities may each behave differently from one another. For example, the area with lower pixel density may show gamma values less bright than the area with higher pixel density, so the area with lower pixel density may use a gamma table that remaps gamma values higher than a gamma table used by the higher pixel density area.

Accordingly, a display that includes areas with two different pixel densities and operates at three different refresh rates and seven DGV may store one hundred twenty six gamma lookup tables (three for each of red, green, and blue multiplied by three for each frequency multiplied by seven for each DGV multiplied by two for the different pixel densities).

However, increasing a number of gamma lookup tables that are stored may increase an amount of memory resources needed to store the gamma lookup tables. For example, doubling the number of gamma lookup tables may double the amount of physical memory needed to store the gamma lookup tables. Increasing the amount of memory resources may increase a physical size of memory and increase costs from the memory itself.

Gamma lookup table compression based on dimensionality reduction may address problems from having displays, one or more of, include areas with different pixel densities, operate at more refresh rates, or operate at more DBV. Generally, dimensionality reduction may be used to reduce the amount of memory needed to represent gamma lookup tables. For example, dimensionality reduction may be used to represent gamma lookup tables with 20% of the number of bits needed to represent the gamma lookup tables without compression.

Gamma lookup tables may slightly vary across different refresh rates and different DBV. For example, a gamma lookup table for a 60 hertz (Hz) refresh rate and DBV 0 may have output values that are very slightly above output values for a gamma lookup table for a 90 Hz refresh rate and DBV 0. Accordingly, dimensionality reduction may be used to represent the gamma lookup tables with basis functions and corresponding weights for the basis functions.

For example, sixteen gamma lookup tables for a single color to be shown in an area with a single pixel density may be represented by two basis functions and sixteen different sets of weights for the basis functions. Each set of weights may correspond to a gamma lookup table, and summing a product of multiplying the two basis functions by the set of weights that correspond to the gamma lookup table may reconstruct the gamma lookup table.

Representing gamma lookup tables with basis functions of sets of weights may be advantageous in that storing the basis functions and weights may require less memory than storing the gamma lookup tables. For example, while storing each basis function may use a same amount of memory as storing each gamma lookup table, fewer basis functions than gamma lookup tables may be stored to represent the gamma lookup tables so less overall memory may be used for storage.

In general, one innovative aspect of the subject matter described in this specification can be embodied in a method that includes the actions of obtaining a selection of a particular display condition for a display panel from among different display conditions for the display panel, selecting, based on the selection of the particular display condition, a set of weights for a set of basis functions from among different sets of weights that correspond to the different display conditions for the display panel, determining a gamma lookup table for the particular display condition for the display panel based on the set of weights that were selected and the set of basis functions, and remapping an image to be output on the display panel based on the gamma lookup table for the particular display condition.

Other embodiments of this aspect include corresponding circuitry, computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. In some aspects, obtaining a selection of a particular display condition for a display panel from among different display conditions for the display panel includes receiving an indication of particular combination of display frequency and display brightness value for the display panel as the particular display condition. In certain aspects, the different display conditions include different combinations of display frequencies and display brightness values for the display panel.

In some implementations, selecting a set of weights for a set of basis functions from among different sets of weights that correspond to the different display conditions for the display panel includes receiving a selection signal that indicates the selection at a multiplexor, where the multiplexor receives the different sets of weights as inputs and in response to the selection signal selects the set of weights to be output from the multiplexor. In certain aspects, determining a gamma lookup table for the particular display condition for the display panel based on the set of weights that were selected and the set of basis functions includes determining a sum of the set of basis functions weighted by the set of weights as the gamma lookup table for the particular display condition.

In some aspects, determining a sum of the set of basis functions weighted by the set of weights as the gamma lookup table for the particular display condition includes determining products of each basis function in the set of basis functions multiplied by a weight for the basis function specified by the set of weights and summing the products as the gamma lookup table for the particular display condition. In some implementations, determining a gamma lookup table for the particular display condition for the display panel based on the set of weights that were selected and the set of basis functions includes determining the gamma lookup table as a predetermined number of values represented by a predetermined number of bits.

In certain aspects, each of the basis functions are specified by the predetermined number of values represented by the predetermined number of bits, and a number of weights in each set of weights corresponds to a number of basis functions in the set of basis functions. In some aspects, remapping an image to be output on the display panel based on the gamma lookup table for the particular display condition includes providing a gamma value for a pixel in the image to the gamma lookup table, receiving a remapped gamma value for the pixel in the image from the gamma lookup table, and providing the remapped gamma value for the pixel in the image for output on the display panel.

In some implementations, actions include obtaining gamma lookup tables that correspond to the different display conditions for the display panel, determining the set of basis functions for the gamma lookup tables based on the gamma lookup tables, determining sets of weights for the set of basis functions that in combination with the set of basis functions represent the gamma lookup tables, and storing both the set of basis functions for the gamma lookup tables and the sets of weights for the set of basis functions on a display device that includes the display panel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
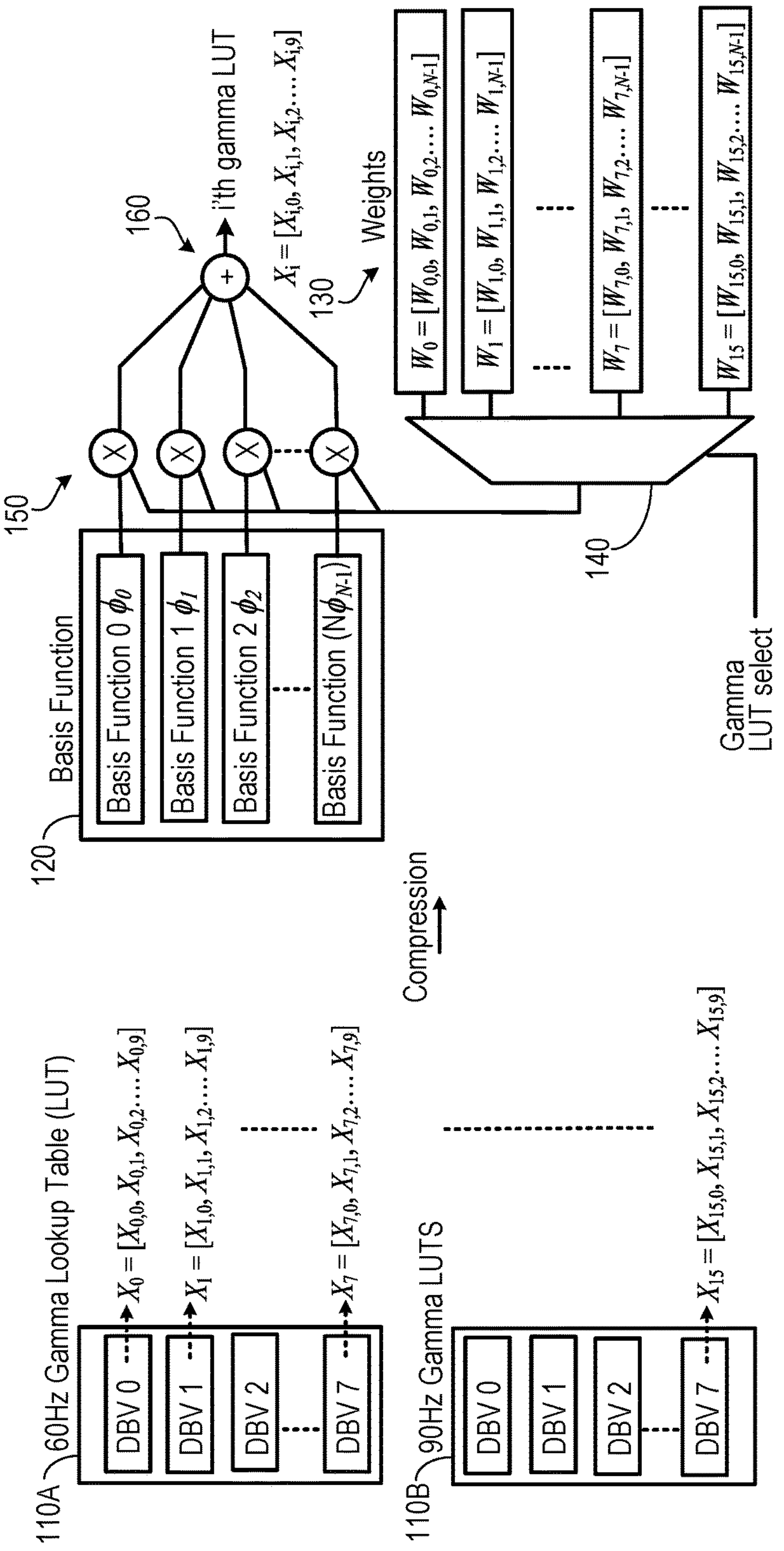
FIG. 1 is a block diagram of an example system with gamma lookup table compression based on dimensionality reduction.

FIG. 1 is a block diagram of an example system 100 with gamma lookup table compression based on dimensionality reduction. The system 100 compresses gamma lookup tables 110A & 110B (collectively referred to as 110) as a set of basis functions 120 and sets of weights 130 that each correspond to one of the gamma lookup tables 110. The gamma lookup tables 110A each corresponds to a different DBV for a display frequency of 60 Hz and the gamma lookup tables 110B each corresponds to a different DBV for a display frequency of 90 Hz. The system 100 may be included in a display device. For example, the system 100 may be included in a smart phone that includes a display panel on which images are displayed with corrections based on the gamma lookup tables.

The system 100 includes a weight selector 140 that selects a set of weights that corresponds to a display condition from the sets of weights 130, multipliers 150 that multiply the set of basis functions 120 by the selected set of weights, and a combiner 160 that combines the product of multiplying the set of basis functions 120 by the selected set of weights.

Figure 2A:
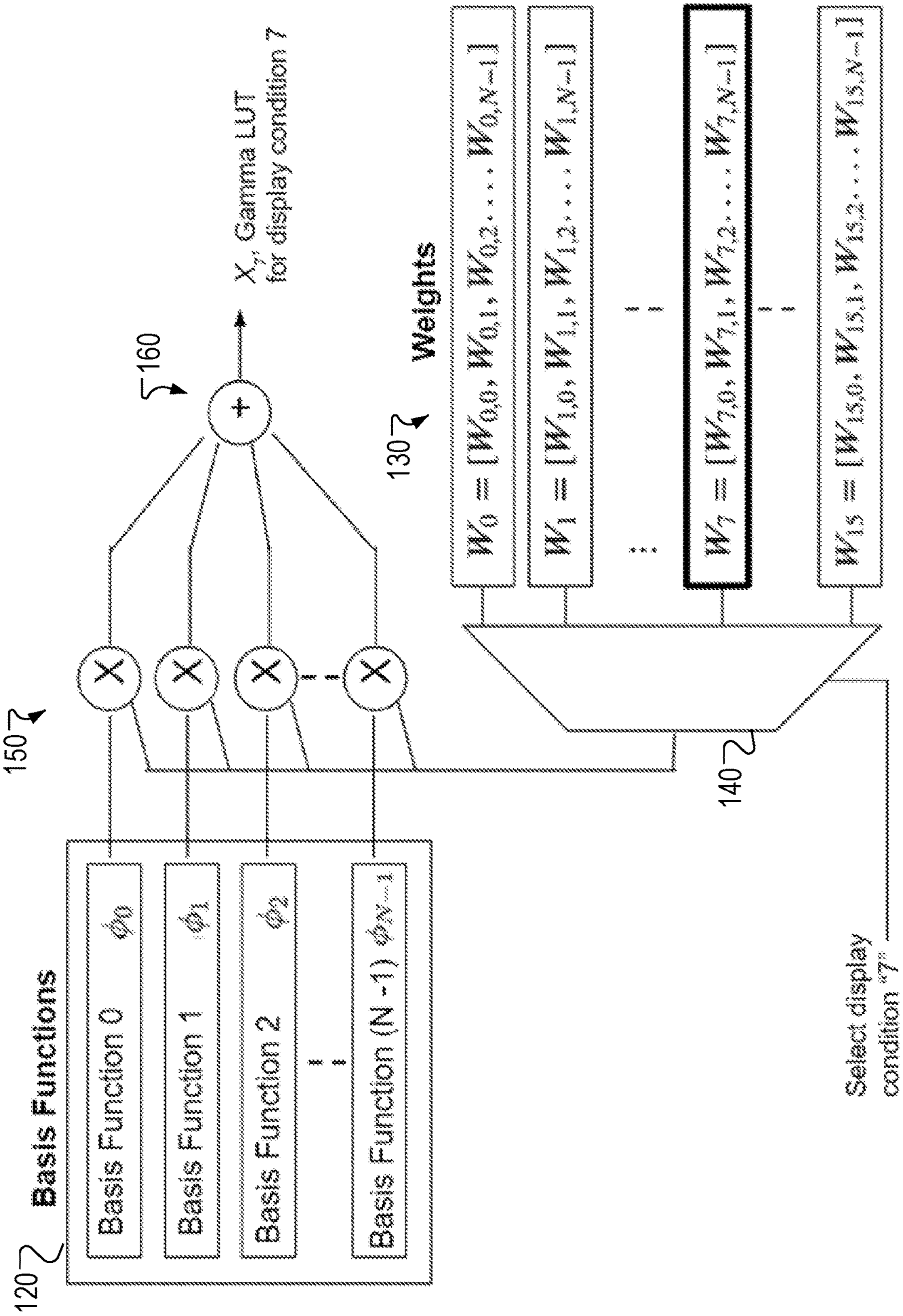
FIG. 2A-2C are additional block diagrams of the example system with gamma lookup table compression based on dimensionality reduction.
Figure 2B:
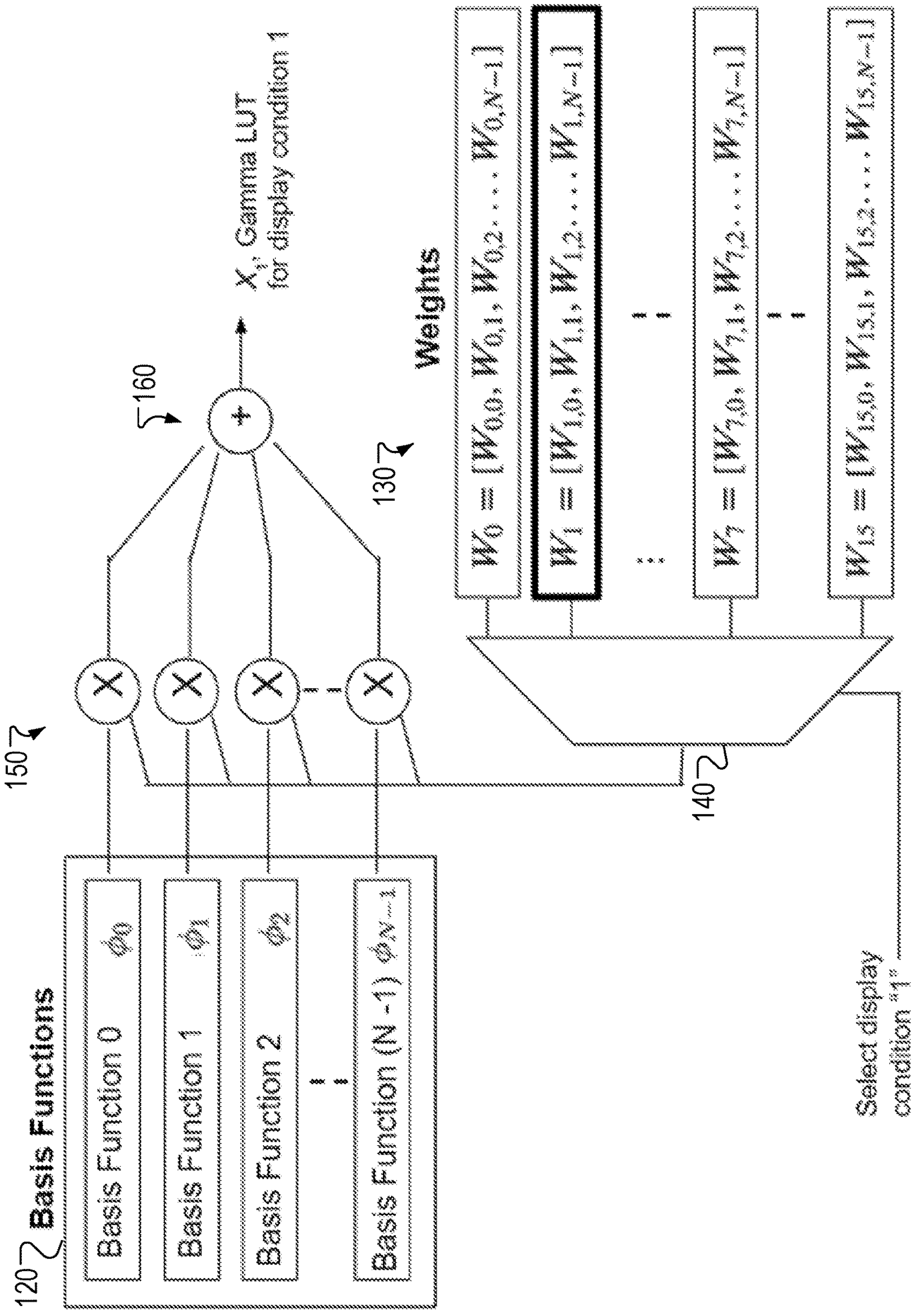
Figure 2C:
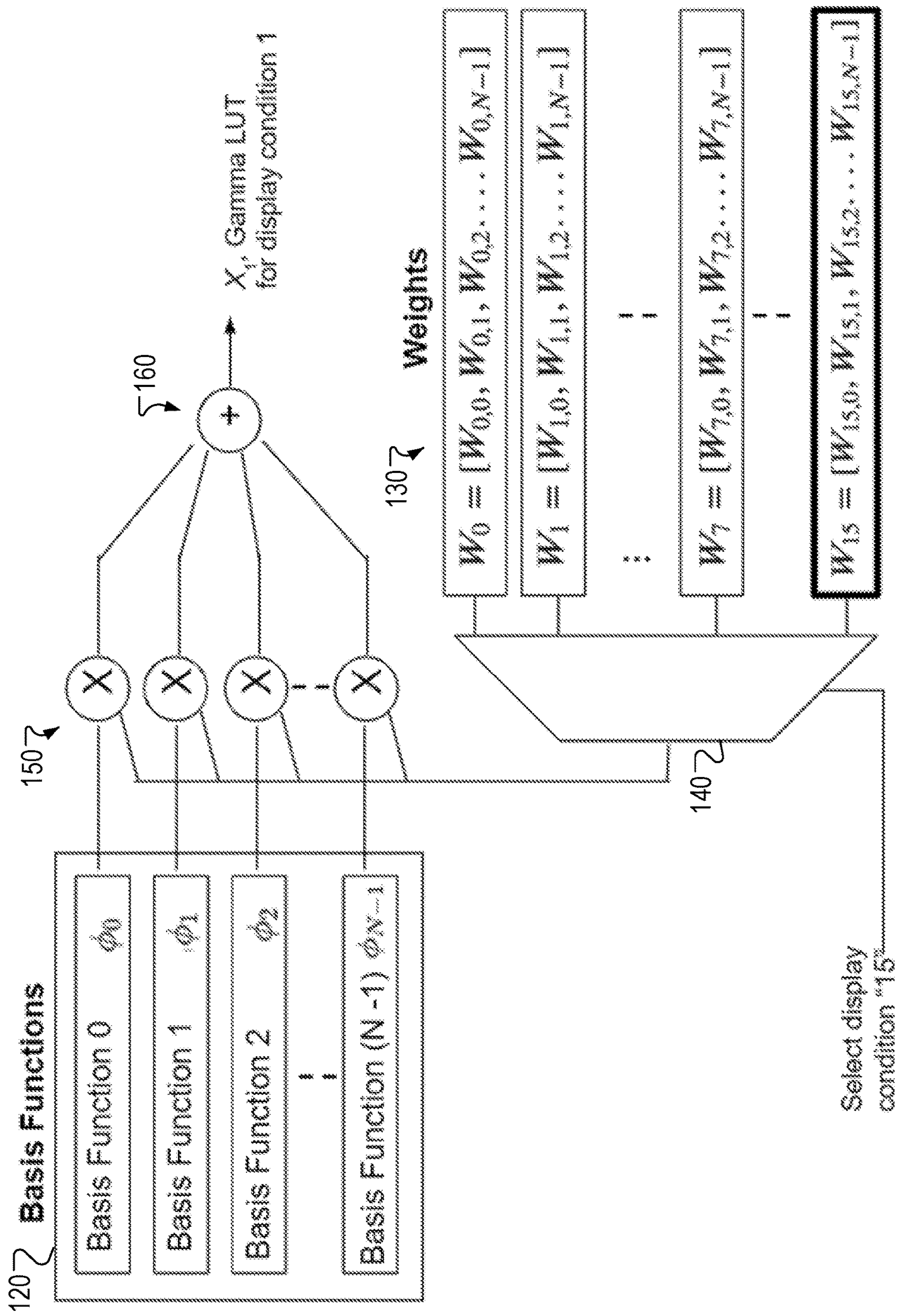

For example, FIG. 2A shows where system 100 is generating a gamma lookup table for a display condition of DBV 7 and display frequency of 60 Hz. In another example, FIG. 2B shows where system 100 is generating a gamma lookup table for a display condition of DBV 1 and display frequency of 60 Hz. In yet another example, FIG. 2C shows where system 100 is generating a gamma lookup table for a display condition of DBV 7 and display frequency of 90 Hz.

The gamma lookup tables 110 may each include a predetermined number of values that define a gamma curve. For example, each gamma lookup table may include ten numbers that are each represented by ten bits. The basis functions 120 may each include a determined number of values. For example, the basis functions 120 may each include ten numbers that are each represented by ten bits.

Even when each basis function is stored with the same amount of memory as a gamma lookup table, the basis functions 120 may together be stored with less memory as the gamma lookup tables 110 as there may be fewer basis functions than gamma lookup tables. For example, sixteen gamma lookup tables 110 may be represented by two, three, four, or some other number less than sixteen of basis functions 120.

The sets of weights 130 may each correspond to a gamma lookup table, and each set of weights may include a weight for each basis function. For example, where there are two basis functions 120 representing sixteen gamma lookup tables 110, there may be sixteen sets of weights 130 where each set of weights includes two weights for the respective basis functions. Each of the weights may be represented by same number of bits as used to represent each value in the gamma lookup table, or fewer bits. For example, each weight may be represented by ten bits.

The weight selector 140 may be a multiplexor that receives the sets of weights 130 as inputs and a gamma lookup table selection as a selection signal, and outputs a selected set of weights. For example, as shown in FIG. 2A, the weight selector 140 receives "7" as the selection signal, where "7" corresponds to set of weights labeled as $W_7$ which corresponds to the display condition of DBV 7 and frequency 60 Hz, and in response, outputs $W_7$. In another example, as shown in FIG. 2B, the weight selector 140 receives "1" as the selection signal, where "1" corresponds to set of weights labeled as $W_1$ which corresponds to the display condition of DBV 1 and frequency 60 Hz, and in response, outputs $W_1$. In yet another example, as shown in FIG. 2B, the weight selector 140 receives "15" as the selection signal, where "15" corresponds to set of weights labeled as $W_{15}$ which corresponds to the display condition of DBV 7 and frequency 90 Hz, and in response, outputs $W_{15}$.

The multipliers 150 receive the basis functions 120 and the set of weights output by the weight selector 140, and multiply the basis functions by the set of weights. For example, where $W_7$ is selected, the multipliers 150 multiply basis function 0 by $W_{7,0}$, multiply basis function 1 by $W_{7,1}$, and multiply basis function 2 by $W_{7,2}$, etc. In another example, where $W_1$ is selected, the multipliers 150 multiply basis function 0 by $W_{1,0}$, multiply basis function 1 by $W_{1,1}$, and multiply basis function 2 by $W_{1,2}$, etc.

The combiner 160 receives the products of multiplication by the multipliers 150 and combines the products as a gamma lookup table. For example, the combiner 160 receives the products from the multipliers 150 and sums all the products of each basis function multiplied by the weight for the basis function specified by the set of weights.

Equation 1 below is an example of calculation of a compression rate based on Principal Component Analysis:

$$R=(10*N*M+24*N*L)/30*M*L \quad \text{(Equation 1)}$$

where R is the rate of compression, N is the number of basis functions, M is the number of values per basis function and per gamma table, L is the number of display conditions, there are ten bits per value in the basis functions and gamma tables, there are three color channels, and there are eight bits per weight. For example, where N=5, L=16, and M=10, R=0.5 so there is a 50% size reduction. In another example, where N=4, L=16, and M=10, R=0.4 so there is a 40% size reduction. As L and M increases, the compression rate increases.

Figure 3:
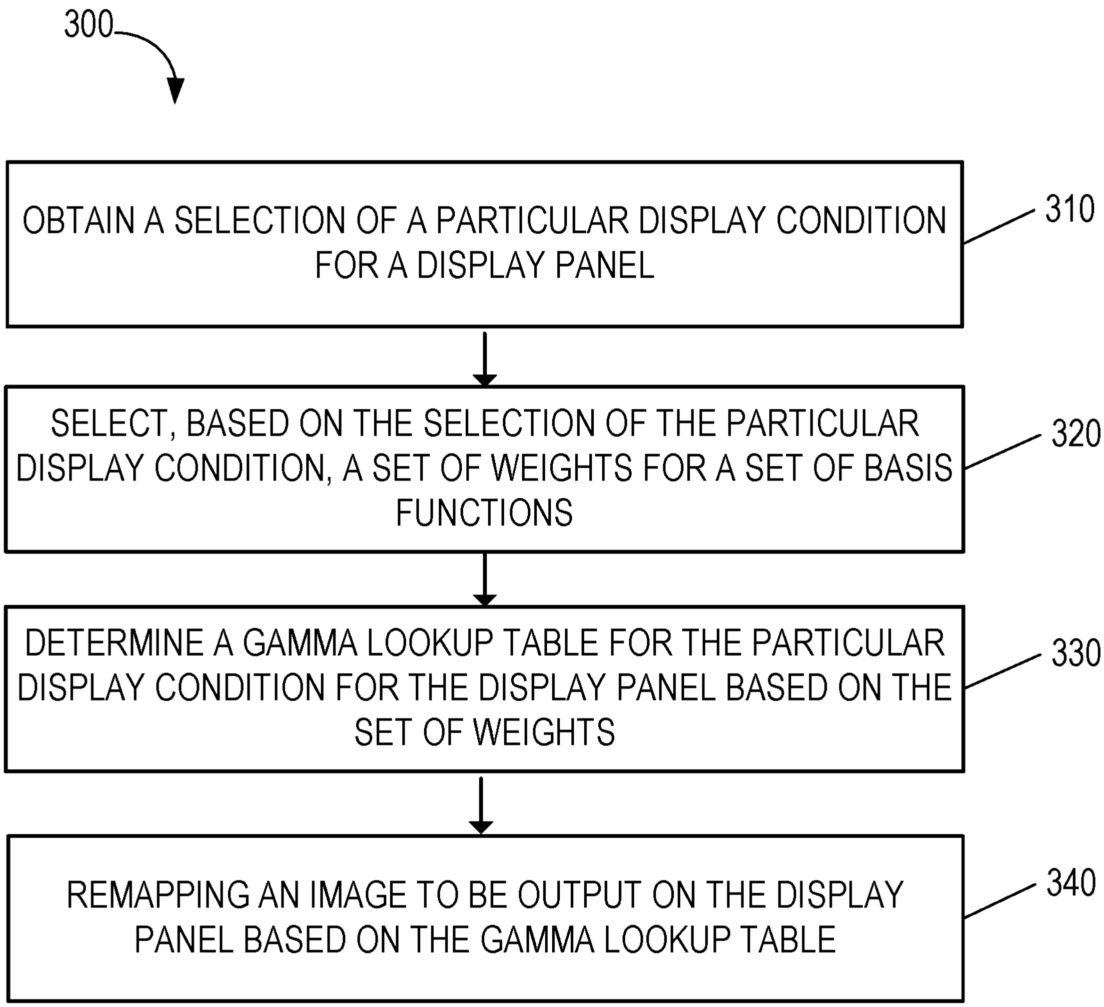
FIG. 3 is a flowchart that shows a process for remapping with compressed gamma lookup tables.

FIG. 3 is a flowchart that shows a process 300 for remapping with compressed gamma lookup tables. The process 300 may be performed by the system 100. Briefly, and as will be described in more detail below, the process 300 includes obtaining a selection of a particular display condition for a display panel (310), selecting, based on the selection of the particular display condition, a set of weights for a set of basis functions (320), determining a gamma lookup table for the particular display condition for the display panel based on the set of weights (330), and remapping an image to be output on the display panel based on the gamma lookup table (340).

The process 300 includes obtaining a selection of a particular display condition fora display panel (310). For example, the system 100 may receive a selection of a DBV of 1 without an indication of a display frequency. In another, the system 100 may receive a selection of a display frequency of 90 Hz without an indication of a DBV.

In some implementations, obtaining a selection of a particular display condition for a display panel from among different display conditions for the display panel includes receiving an indication of particular combination of display frequency and display brightness value for the display panel as the particular display condition. For example, a display device may receive a user input that indicates that the user would like the display device to display with DBV 7 and a display frequency of 60 Hz and, in response, the weight selector 140 may receive an indication of "7" which corresponds to the set of weights $W_7$ that corresponds to DBV 7 and a display frequency of 60 Hz. In another example, a display device may receive a user input that indicates that the user would like the display device to display with DBV 1 and a display frequency of 60 Hz and, in response, the weight selector 140 may receive an indication of "1" which corresponds to the set of weights $W_1$ that corresponds to DBV 1 and a display frequency of 60 Hz.

In some implementations, a selection of a particular display condition for a display panel may be a selection from among different display conditions for the display panel, where the different display conditions include different combinations of display frequencies and display brightness values for the display panel. For example, where the display panel may operate at DBV 0-7 and at a display frequency of 60 Hz or 90 Hz, there may be sixteen different display conditions. In another example, where the display panel may operate at DBV 0-9 and at a display frequency of 60 Hz, 90 Hz, or 120 Hz, there may be thirty different display conditions.

The process 300 includes selecting, based on the selection of the particular display condition, a set of weights for a set of basis functions (320). For example, the set of weights $W_7$ that corresponds to DBV 7 and display frequency 60 Hz may be selected. In another example, the set of weights $W_1$ that corresponds to DBV 1 and display frequency 60 Hz may be selected.

In some implementations, selecting a set of weights for a set of basis functions from among different sets of weights that correspond to the different display conditions for the display panel includes receiving a selection signal that indicates the selection at a multiplexor, where the multiplexor receives the different sets of weights as inputs and in response to the selection signal selects the set of weights to be output from the multiplexor.

For example, the weight selector 140 may receive an indication of "7" which corresponds to the set of weights $W_7$ and, in response, output $W_7$. In another example, the weight selector 140 may receive an indication of "1" which corresponds to the set of weights $W_1$ and, in response, output $W_1$. In yet another example, the weight selector 140 may receive an indication of "15" which corresponds to the set of weights $W_{15}$ and, in response, output $W_{15}$.

The process 300 includes determining a gamma lookup table for the particular display condition for the display panel based on the set of weights (330). For example, the gamma lookup table for DBV 7 and display frequency 60 Hz may be determined from the basis functions 120 and the set weights $W_7$. In another example, the gamma lookup table for DBV 1 and display frequency 60 Hz may be determined from the basis functions 120 and the set weights $W_1$. In yet another example, the gamma lookup table for DBV 7 and display frequency 90 Hz may be determined from the basis functions 120 and the set weights $W_{15}$.

In some implementations, determining a gamma lookup table for the particular display condition for the display panel based on the set of weights that were selected and the set of basis functions includes determining a sum of the set of basis functions weighted by the set of weights as the gamma lookup table for the particular display condition. For example, the gamma lookup table for DBV 7 and display frequency 60 Hz may be determined by determining, with the combiner 160, a sum of the basis functions 120 weighted by $W_7$. In another example, the gamma lookup table for DBV 1 and display frequency 60 Hz may be determined by determining, with the combiner 160, a sum of the basis functions 120 weighted by $W_1$. In yet another example, the gamma lookup table for DBV 7 and display frequency 90 Hz may be determined by determining, with the combiner 160, a sum of the basis functions 120 weighted by $W_{15}$.

In some implementations, determining a sum of the set of basis functions weighted by the set of weights as the gamma lookup table for the particular display condition includes determining products of each basis function in the set of basis functions multiplied by a weight for the basis function specified by the set of weights and summing the products as the gamma lookup table for the particular display condition.

For example, the products of each of the basis functions 120 and set of weights $W_7$ may be determined by the multipliers 150 and the combiner 160 may then sum the outputs of the multipliers 150 as a gamma lookup table for DBV 7 and display frequency 60 Hz. In another example, the products of each of the basis functions 120 and set of weights $W_1$ may be determined by the multipliers 150 and the combiner 160 may then sum the outputs of the multipliers 150 as a gamma lookup table for DBV 1 and display frequency 60 Hz. In yet another example, the products of each of the basis functions 120 and set of weights $W_{15}$ may be determined by the multipliers 150 and the combiner 160 may then sum the outputs of the multipliers 150 as a gamma lookup table for DBV 7 and display frequency 90 Hz.

In some implementations, determining a gamma lookup table for the particular display condition for the display panel based on the set of weights that were selected and the set of basis functions includes determining the gamma lookup table as a predetermined number of values represented by a predetermined number of bits. For example, the gamma lookup table may include ten values that are each represented by ten bits. In another example, the gamma lookup table may include twelve values that are each represented by eight bits.

In some implementations, each of the basis functions are specified by the predetermined number of values represented by the predetermined number of bits, and a number of weights in each set of weights corresponds to a number of basis functions in the set of basis functions. For example, each of two basis functions may be represented by ten values that are each represented by ten bits, where each of the gamma lookup tables are also represented by ten values each represented by ten bits, and there are two weights in each set of weights where each weight is represented by ten bits.

The process 300 includes remapping an image to be output on the display panel based on the gamma lookup table (340). For example, a display device may remap a gamma value of G80 for a pixel in an image to G81 based on the gamma lookup table. In another example, a display device may then remap a gamma value of G60 for a pixel in an image to G59 based on the gamma lookup table.

In some implementations, remapping an image to be output on the display panel based on the gamma lookup table for the particular display condition includes providing a gamma value for a pixel in the image to the gamma lookup table, receiving a remapped gamma value for the pixel in the image from the gamma lookup table, and providing the remapped gamma value for the pixel in the image for output on the display panel.

For example, the display device may provide a gamma value of G80 to the gamma lookup table as input, receive a remapped gamma value of G81 as output from the gamma lookup table, and then provide the remapped gamma value of G81 to a driver integrated circuit that is configured to receive remapped values and provide voltage to pixels in a display.

In some implementations, the process 300 includes obtaining gamma lookup tables that correspond to the different display conditions for the display panel, determining the set of basis functions for the gamma lookup tables based on the gamma lookup tables, determining sets of weights for the set of basis functions that in combination with the set of basis functions represent the gamma lookup tables, and storing both the set of basis functions for the gamma lookup tables and the sets of weights for the set of basis functions on a display device that includes the display panel.

For example, a computing device at a factory that manufactures the display device may receive a number of images of a display panel of the display device under different display conditions, generate a gamma lookup table for each of the display conditions from the images, perform dimensionality reduction on the gamma lookup tables to obtain a set of basis functions and sets of weights for the set of basis functions, and then store the basis functions and sets of weights for the basis functions on the display device.

Dimensionality reduction may be performed with various techniques including, but not limited to, Discrete Cosine Transform, Fourier Transform, Compressive Sensing, or Principal Component Analysis. Compression may be obtained through pruning basis functions to remove basis functions that have smaller weights.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificiallygenerated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or OLED (organic light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

obtaining a selection of a particular display condition for a display panel of a computing device from among different display conditions for the display panel;

selecting, based on the selection of the particular display condition, a set of weights for a set of basis functions from among different sets of weights that are stored by the computing device and that correspond to the different display conditions for the display panel;

determining a gamma lookup table for the particular display condition for the display panel based on the set of weights that were selected and the set of basis functions; and remapping an image to be output on the display panel based on the gamma lookup table for the particular display condition.

2. The method of claim 1, wherein obtaining a selection of a particular display condition for a display panel from among different display conditions for the display panel comprises:

receiving an indication of particular combination of display frequency and display brightness value for the display panel as the particular display condition.

3. The method of claim 1, wherein the different display conditions comprise different combinations of display frequencies and display brightness values for the display panel.

4. The method of claim 1, comprising:

obtaining gamma lookup tables that correspond to the different display conditions for the display panel;

determining the set of basis functions for the gamma lookup tables based on the gamma lookup tables;

determining sets of weights for the set of basis functions that in combination with the set of basis functions represent the gamma lookup tables; and storing both the set of basis functions for the gamma lookup tables and the sets of weights for the set of basis functions on a display device that includes the display panel.

5. A method comprising:

obtaining a selection of a particular display condition for a display panel from among different display conditions for the display panel;

selecting, based on the selection of the particular display condition, a set of weights for a set of basis functions from among different sets of weights that correspond to the different display conditions for the display panel, wherein selecting a set of weights for a set of basis functions from among different sets of weights that correspond to the different display conditions for the display panel comprises receiving a selection signal that indicates the selection at a multiplexor, wherein the multiplexor receives the different sets of weights as inputs and in response to the selection signal selects the set of weights to be output from the multiplexor;

determining a gamma lookup table for the particular display condition for the display panel based on the set of weights that were selected and the set of basis functions; and remapping an image to be output on the display panel based on the gamma lookup table for the particular display condition.

6. A method comprising:

obtaining a selection of a particular display condition for a display panel from among different display conditions for the display panel;

selecting, based on the selection of the particular display condition, a set of weights for a set of basis functions from among different sets of weights that correspond to the different display conditions for the display panel;

determining a gamma lookup table for the particular display condition for the display panel based on the set of weights that were selected and the set of basis functions, wherein determining a gamma lookup table for the particular display condition for the display panel based on the set of weights that were selected and the set of basis functions comprises determining a sum of the set of basis functions weighted by the set of weights as the gamma lookup table for the particular display condition; and remapping an image to be output on the display panel based on the gamma lookup table for the particular display condition.

7. The method of claim 6, wherein determining a sum of the set of basis functions weighted by the set of weights as the gamma lookup table for the particular display condition comprises:

determining products of each basis function in the set of basis functions multiplied by a weight for the basis function specified by the set of weights; and summing the products as the gamma lookup table for the particular display condition.

8. A method comprising:

obtaining a selection of a particular display condition for a display panel from among different display conditions for the display panel;

selecting, based on the selection of the particular display condition, a set of weights for a set of basis functions from among different sets of weights that correspond to the different display conditions for the display panel;

determining a gamma lookup table for the particular display condition for the display panel based on the set of weights that were selected and the set of basis functions, wherein determining a gamma lookup table for the particular display condition for the display panel based on the set of weights that were selected and the set of basis functions comprises determining the gamma lookup table as a predetermined number of values represented by a predetermined number of bits; and remapping an image to be output on the display panel based on the gamma lookup table for the particular display condition.

9. The method of claim 8, wherein each of the basis functions are specified by the predetermined number of values represented by the predetermined number of bits, and a number of weights in each set of weights corresponds to a number of basis functions in the set of basis functions.

10. A method comprising:

obtaining a selection of a particular display condition for a display panel from among different display conditions for the display panel;

selecting, based on the selection of the particular display condition, a set of weights for a set of basis functions from among different sets of weights that correspond to the different display conditions for the display panel;

determining a gamma lookup table for the particular display condition for the display panel based on the set of weights that were selected and the set of basis functions; and remapping an image to be output on the display panel based on the gamma lookup table for the particular display condition, wherein remapping an image to be output on the display panel based on the gamma lookup table for the particular display condition comprises:

providing a gamma value for a pixel in the image to the gamma lookup table;

receiving a remapped gamma value for the pixel in the image from the gamma lookup table; and providing the remapped gamma value for the pixel in the image for output on the display panel.

11. A system that includes circuitry configured to perform operations of:

obtaining a selection of a particular display condition for a display panel of a computing device from among different display conditions for the display panel;

selecting, based on the selection of the particular display condition, a set of weights for a set of basis functions from among different sets of weights that are stored by the computing device and that correspond to the different display conditions for the display panel;

determining a gamma lookup table for the particular display condition for the display panel based on the set of weights that were selected and the set of basis functions; and remapping an image to be output on the display panel based on the gamma lookup table for the particular display condition.

12. The system of claim 11, wherein obtaining a selection of a particular display condition for a display panel from among different display conditions for the display panel comprises:

receiving an indication of particular combination of display frequency and display brightness value for the display panel as the particular display condition.

13. The system of claim 11, wherein the different display conditions comprise different combinations of display frequencies and display brightness values for the display panel.

14. A system that includes circuitry configured to perform operations of:

obtaining a selection of a particular display condition for a display panel from among different display conditions for the display panel;

selecting, based on the selection of the particular display condition, a set of weights for a set of basis functions from among different sets of weights that correspond to the different display conditions for the display panel, wherein selecting a set of weights for a set of basis functions from among different sets of weights that correspond to the different display conditions for the display panel comprises receiving a selection signal that indicates the selection at a multiplexor, wherein the multiplexor receives the different sets of weights as inputs and in response to the selection signal selects the set of weights to be output from the multiplexor;

determining a gamma lookup table for the particular display condition for the display panel based on the set of weights that were selected and the set of basis functions; and remapping an image to be output on the display panel based on the gamma lookup table for the particular display condition.

15. A system that includes circuitry configured to perform operations of:

obtaining a selection of a particular display condition for a display panel from among different display conditions for the display panel;

selecting, based on the selection of the particular display condition, a set of weights for a set of basis functions from among different sets of weights that correspond to the different display conditions for the display panel;

determining a gamma lookup table for the particular display condition for the display panel based on the set of weights that were selected and the set of basis functions, wherein determining a gamma lookup table for the particular display condition for the display panel based on the set of weights that were selected and the set of basis functions comprises determining a sum of the set of basis functions weighted by the set of weights as the gamma lookup table for the particular display condition; and remapping an image to be output on the display panel based on the gamma lookup table for the particular display condition.

16. The system of claim 15, wherein determining a sum of the set of basis functions weighted by the set of weights as the gamma lookup table for the particular display condition comprises:

determining products of each basis function in the set of basis functions multiplied by a weight for the basis function specified by the set of weights; and summing the products as the gamma lookup table for the particular display condition.

17. A system that includes circuitry configured to perform operations of:

obtaining a selection of a particular display condition for a display panel from among different display conditions for the display panel;

selecting, based on the selection of the particular display condition, a set of weights for a set of basis functions from among different sets of weights that correspond to the different display conditions for the display panel;

determining a gamma lookup table for the particular display condition for the display panel based on the set of weights that were selected and the set of basis functions, wherein determining a gamma lookup table for the particular display condition for the display panel based on the set of weights that were selected and the set of basis functions comprises determining the gamma lookup table as a predetermined number of values represented by a predetermined number of bits; and remapping an image to be output on the display panel based on the gamma lookup table for the particular display condition.

18. The system of claim 17, wherein each of the basis functions are specified by the predetermined number of values represented by the predetermined number of bits, and a number of weights in each set of weights corresponds to a number of basis functions in the set of basis functions.

19. A system that includes circuitry configured to perform operations of:

obtaining a selection of a particular display condition for a display panel from among different display conditions for the display panel;

selecting, based on the selection of the particular display condition, a set of weights for a set of basis functions from among different sets of weights that correspond to the different display conditions for the display panel;

determining a gamma lookup table for the particular display condition for the display panel based on the set of weights that were selected and the set of basis functions; and remapping an image to be output on the display panel based on the gamma lookup table for the particular display condition, wherein remapping an image to be output on the display panel based on the gamma lookup table for the particular display condition comprises:

providing a gamma value for a pixel in the image to the gamma lookup table;

receiving a remapped gamma value for the pixel in the image from the gamma lookup table; and providing the remapped gamma value for the pixel in the image for output on the display panel.

* * * * *